US012246418B2

(12) United States Patent
Shaw et al.

(10) Patent No.: US 12,246,418 B2
(45) Date of Patent: Mar. 11, 2025

(54) LOAD MEASUREMENT SYSTEM FOR HYDRAULIC TORQUE WRENCH

(71) Applicant: ENERPAC TOOL GROUP CORP., Menomonee Falls, WI (US)

(72) Inventors: Robin Shaw, Whitley Bay (GB); Andrew Dumelow, North Shields (GB)

(73) Assignee: ENERPAC TOOL GROUP CORP., Menomonee Falls, WI (US)

( * ) Notice: Subject to any disclaimer, the term of this patent is extended or adjusted under 35 U.S.C. 154(b) by 0 days.

(21) Appl. No.: 18/026,367

(22) PCT Filed: Oct. 15, 2021

(86) PCT No.: PCT/US2021/055262

§ 371 (c)(1),
(2) Date: Mar. 15, 2023

(87) PCT Pub. No.: WO2022/082031

PCT Pub. Date: Apr. 21, 2022

(65) Prior Publication Data

US 2024/0058928 A1 Feb. 22, 2024

Related U.S. Application Data

(60) Provisional application No. 63/092,065, filed on Oct. 15, 2020.

(51) Int. Cl.
*B25B 23/145* (2006.01)

(52) U.S. Cl.
CPC ................................ *B25B 23/1453* (2013.01)

(58) Field of Classification Search
CPC .............. B25B 23/0078; B25B 21/005; B25B 23/1456; B25B 23/1453; Y10T 74/1581; Y10T 74/1556
See application file for complete search history.

(56) References Cited

U.S. PATENT DOCUMENTS 4,845,998 A 7/1989 Demartelaere
4,941,362 A * 7/1990 Tambini ................ B25B 21/005 81/470

(Continued)

FOREIGN PATENT DOCUMENTS

EP 1022097 7/2000
EP 2113341 A2 11/2009
JP 11-114846 4/1999

OTHER PUBLICATIONS

International Preliminary report on Patentability for PCT/US2021/055262 dated Oct. 15, 2021.

(Continued)

*Primary Examiner* — Nathaniel C Chukwurah
(74) *Attorney, Agent, or Firm* — ANDRUS INTELLECTUAL PROPERTY LAW, LLP

(57) ABSTRACT

A hydraulic torque wrench and a method of determining a load exerted on a workpiece by a hydraulic torque wrench. The wrench may generally include a housing; a drive element for engaging the workpiece; a drive actuator for transmitting a torque to the drive element; and a gauge coupled to at least one of the housing and the drive actuator, the gauge being configured to detect a characteristic indicative of a torque exerted by the drive element to the workpiece. The wrench may include a sensor configured to detect rotation of the drive element.

28 Claims, 5 Drawing Sheets

(56) References Cited

U.S. PATENT DOCUMENTS

| | | | | |
|---|---|---|---|---|
| 5,007,153 | A * | 4/1991 | Junkers | B25B 23/14<br>73/862.25 |
| 5,103,696 | A * | 4/1992 | Beuke | B25B 21/005<br>81/57.44 |
| 6,112,622 | A * | 9/2000 | Reiman | B25B 21/005<br>81/57.44 |
| 6,965,835 | B2 | 11/2005 | McGee | |
| 7,000,486 | B2 | 2/2006 | Wagner | |
| 10,300,585 | B2 | 5/2019 | Da Fonseca | |
| 2002/0152820 | A1 | 10/2002 | Tsuji et al. | |
| 2004/0187650 | A1* | 9/2004 | Sittig | B25B 21/005<br>81/467 |
| 2009/0000397 | A1* | 1/2009 | Wagner | B25B 23/145<br>73/862.23 |
| 2014/0165790 | A1* | 6/2014 | Neiss | B25B 23/1456<br>81/57.39 |
| 2019/0105762 | A1 | 4/2019 | Hughes et al. | |
| 2019/0358793 | A1 | 11/2019 | Billiet et al. | |

OTHER PUBLICATIONS

International Search Report and the Written Opinion for PCT/US2021/055262 dated Feb. 10, 2022.
Partial Supplementary European Search Report for EP 21881210.5, dated Oct. 10, 2024.

* cited by examiner

LOAD MEASUREMENT SYSTEM FOR HYDRAULIC TORQUE WRENCH

CROSS-REFERENCE TO RELATED APPLICATIONS

This application is the U.S. national stage application of International Application PCT/US2021/055262, filed Oct. 15, 2021, which international application was published on Apr. 21, 2022, as International Publication WO 2022/082031. The International Application claims the benefit of U.S. Patent Application No. 63/092,065, filed Oct. 15, 2020. Both applications are hereby incorporated by reference in entirety.

FIELD

The present disclosure relates to industrial tools and, particularly, to hydraulic torque wrenches.

SUMMARY

Industrial tools such as hydraulic torque wrenches use pressurized fluid to apply large torques to a workpiece (e.g., fastener, nut, etc.). In particular, application of pressurized fluid to a piston drives a socket to rotate in a first direction.

In one independent aspect, a hydraulic torque wrench operable to exert a torque on a workpiece may be provided. The wrench may generally include a housing; a drive element for engaging the workpiece; a drive actuator for transmitting a torque to the drive element; and a gauge coupled to at least one of the housing and the drive actuator, the gauge being configured to detect a characteristic indicative of a torque exerted by the drive element to the workpiece.

In some constructions, the wrench may include a control system configured to calculate a torque value based on the strain value. In some constructions, the drive actuator may include a lever arm for rotating the drive element, and the gauge may be at least one strain gauge coupled to the lever arm configured to measure a bending strain of the lever arm. In some constructions, the gauge may detect a reaction force exerted on a reaction portion of the housing.

In another independent aspect, a hydraulic torque wrench may generally include a housing; drive element for engaging the workpiece; a drive actuator for transmitting a torque to the drive element; and a sensor supported by the housing and configured to detect rotation of the drive element.

In some constructions, the sensor may detect a position of a magnet driven to rotate due to rotation of drive element. In some constructions, the sensor may communicate a position of the magnet to a control system.

In yet another independent aspect, a method may generally include detecting at least one of a strain of a lever arm transmitting torque to the drive element and a reaction force exerted on a housing of the torque wrench; detecting an angle of rotation of the drive element; determining a torque based on the at least one of the detected strain and the detected reaction force; and determining a load exerted on the workpiece based on the torque and the angle of rotation.

In a further independent aspect, a method may generally include detecting at least one of a strain of a lever arm transmitting torque to the drive element and a reaction force exerted on a housing of the torque wrench; determining a torque based on the at least one of the detected strain and the detected reaction force; and determining a load exerted on the workpiece based on the torque.

In another independent aspect, a method may generally include detecting an angle of rotation of the drive element; and determining a load exerted on the workpiece based on the angle of rotation.

Other independent aspects may become apparent by consideration of the detailed description, claims, and accompanying drawings.

DETAILED DESCRIPTION

Figure 1:
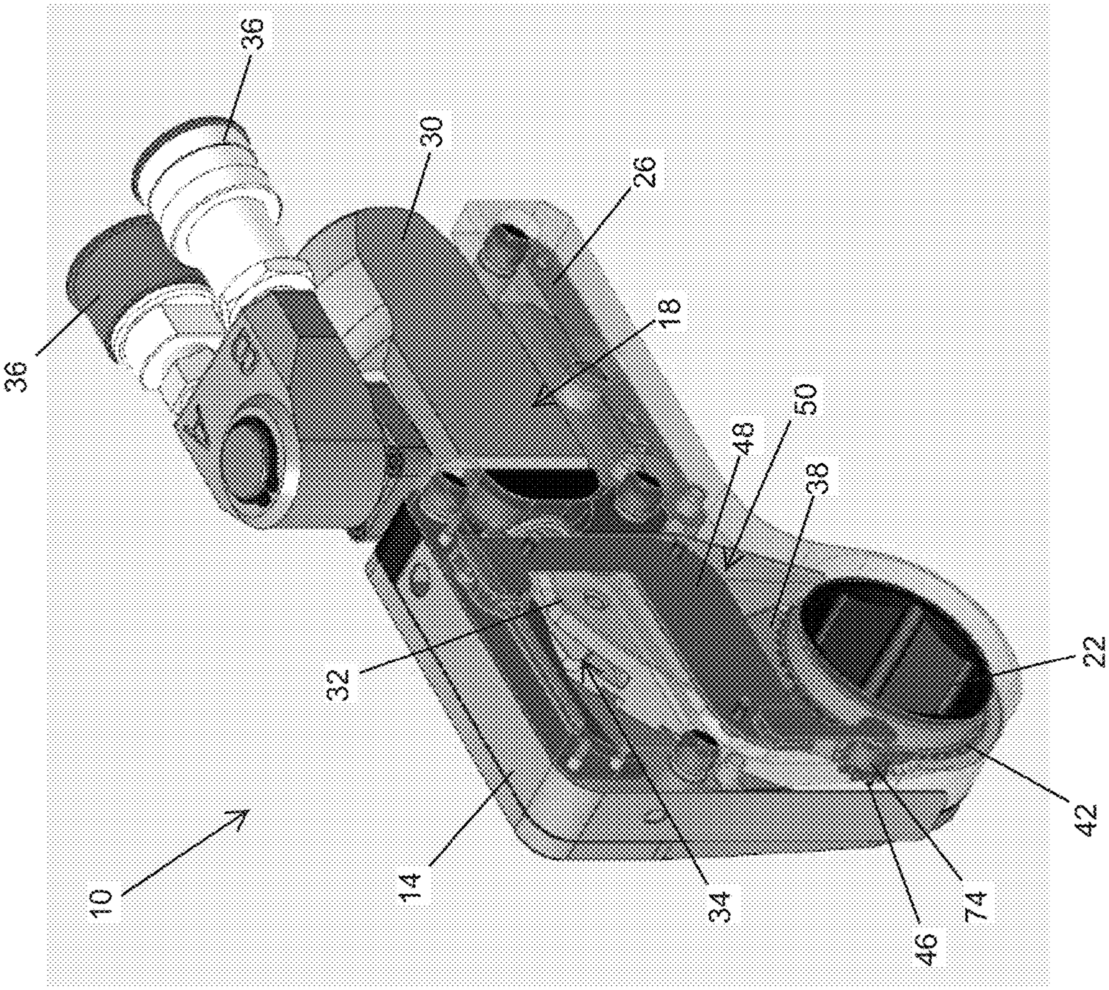
FIG. 1 is a perspective view of a hydraulic torque wrench.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Figure 2:
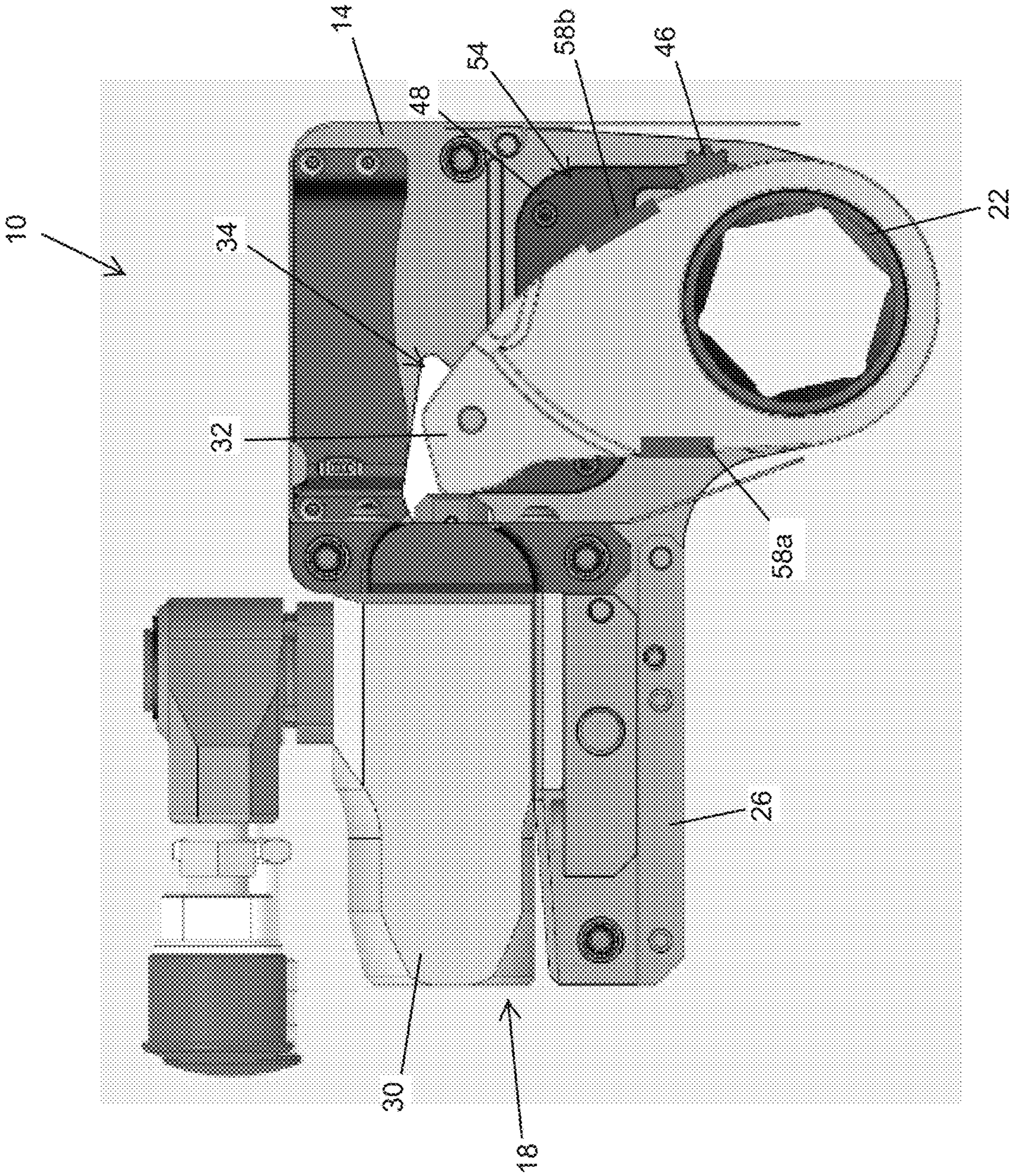
FIG. 2 is a side view of the wrench of FIG. 1, including a torque detection mechanism in a first location on the wrench.
Figure 3:
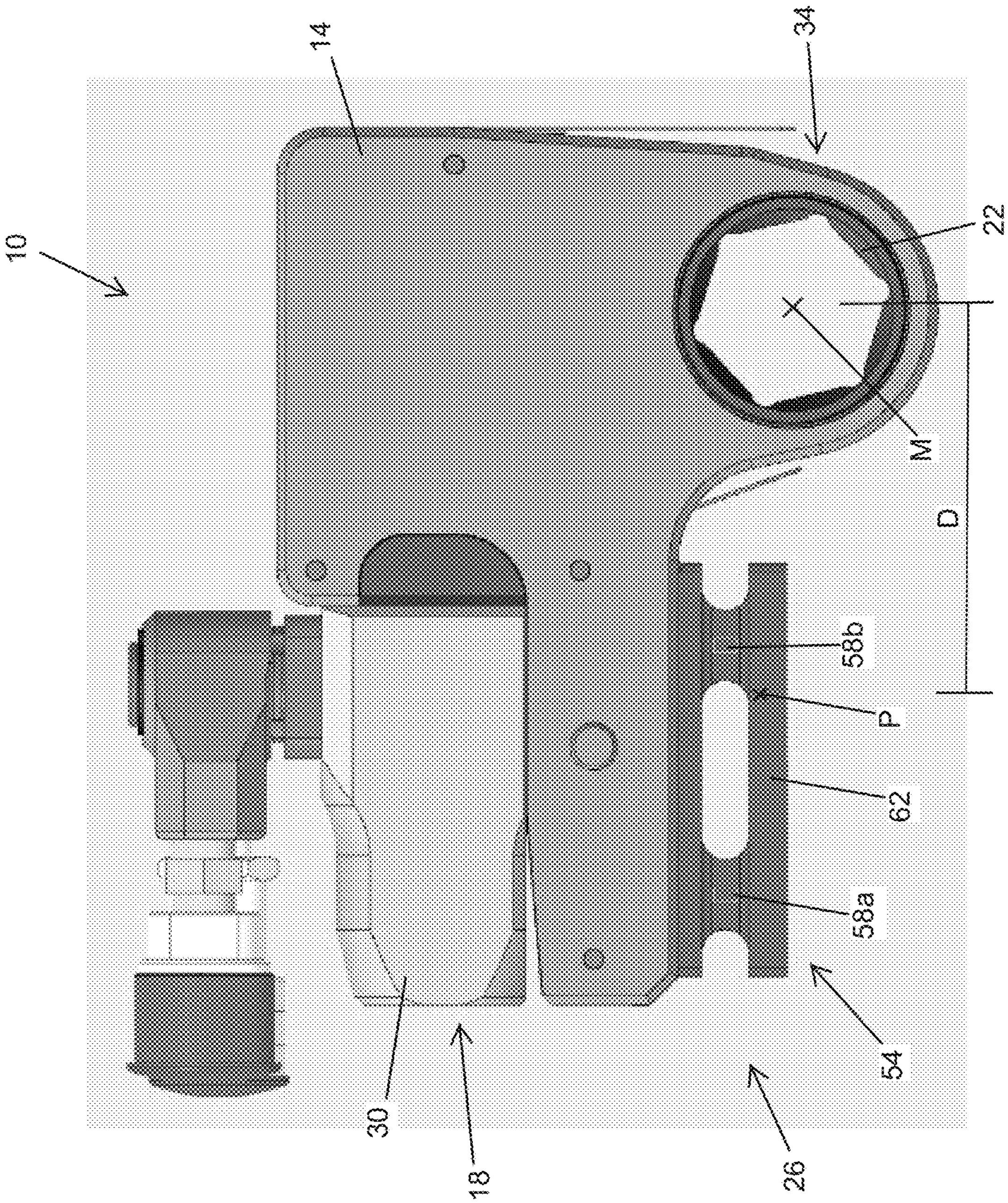
FIG. 3 is a side view of the wrench of FIG. 1, including the torque detection mechanism in a second location on the wrench.

FIGS. 1-3 illustrate an industrial tool, such as a hydraulic torque wrench 10 for applying torque to a workpiece or fastener (e.g., nut, bolt, etc. (not shown)). The illustrated wrench 10 includes a cassette or housing 14 supporting a drive element, and the housing 14 is connectable to a drive unit 18 for driving the drive element. In the illustrated construction, the drive element is a socket 22 for receiving a portion of the workpiece; in other constructions (not shown), the drive element may include a drive shaft or other suitable drive element.

The wrench 10 also includes a reaction portion or reaction arm 26. In the illustrated construction, the reaction arm 26 is integrally formed with the housing 14. In some constructions (not shown), the reaction arm 26 is removably attached to the housing 14. The housing 14 may be constructed of metal (e.g., steel), a durable and lightweight plastic material, a combination thereof, etc.

The drive unit 18 includes a fluid actuator 30 and a working end 34. The working end 34 is driven by the fluid actuator 30 and is coupled to a lever arm 32 supported on the housing 14.

In the illustrated construction, the fluid actuator 30 includes a cylinder supporting at least one piston. Movement of the piston drives the working end 34 between an extended position and a retracted position. The fluid actuator 30 is in fluid communication with an external source of pressurized fluid (such as a pump (not shown)) via one or more fluid hoses 36. In some constructions, the hose(s) are connected to the drive unit 18 and placed in fluid communication with the fluid actuator 30 by a quick disconnect coupler, although other types of connections are possible. Pressurized fluid supplied to the fluid actuator 30 drives movement of the piston, which, in turn, drives movement of the working end 34 (e.g., by a rod connected between the piston and the working end 34).

As shown in FIGS. 1-2, the working end 34 is coupled to the lever arm 32, which, in turn, engages a sprocket 42 by at least one pawl 38 (FIG. 1). In the illustrated constructions, the sprocket 42 is positioned adjacent an outer surface of the socket 22, and rotation of the sprocket 42 drives the socket 22 to rotate in a first direction (e.g., clockwise as illustrated in FIG. 2). Rotation of the socket 22 transmits torque to a workpiece, such as a fastener.

When hydraulic pressure is applied to the fluid actuator 30 to extend the working end 34, the lever arm 32 is driven to pivot in the first direction. The pawl 38 engages the sprocket 42, thereby causing the sprocket 42 to rotate. Specifically, teeth of the pawl 38 engage corresponding teeth of the sprocket 42 to rotate the sprocket 42 and, as a result, also rotates the workpiece engaged by the socket 22. The lever arm 32 pivots through an angle of rotation as the fluid actuator 30 extends to its maximum stroke length. As the fluid actuator retracts, the teeth of the pawl 38 slip relative to the sprocket 42, thereby allowing the lever arm 32 to ratchet relative to the socket 22.

In the illustrated construction, a workpiece or fastener may be tightened by positioning the fastener within the socket 22 such that rotation of the socket 22 in the first direction applies torque in a direction to tighten the fastener. Alternatively, to loosen the fastener, the wrench 10 can be flipped to engage the fastener from the other side of the socket 22, which would still be rotated in the first direction.

Figure 5:
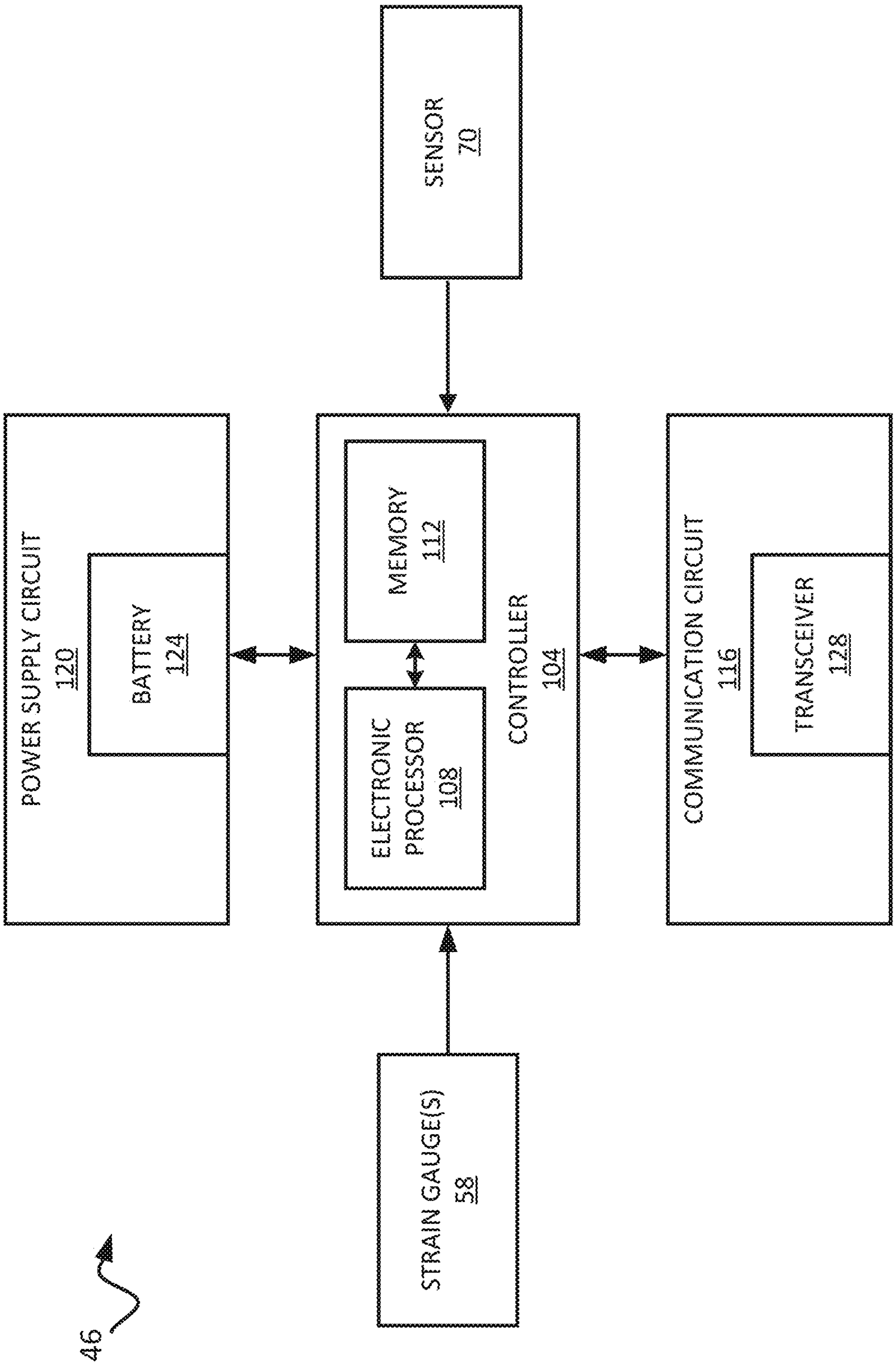
FIG. 5 is a block diagram of a control system of the wrench of FIG. 1.

With reference to FIG. 1, the wrench 10 includes a control system 46 (see FIG. 5) with a printed circuit board (PCB) 48 supported by an inner portion of the housing 14. The PCB 48 supports one or more electronic elements for measuring aspects of conditions and/or operation of the wrench 10.

The wrench 10 includes a torque detection mechanism 54 for measuring a torque exerted by the wrench 10 onto a workpiece. In the construction shown in FIG. 2, the torque detection mechanism 54 includes one or more strain gauges 58*a*, 58*b* (two shown) coupled to the lever arm 32. More specifically, the drive system 18 includes a first strain gauge 58*a* and a second strain gauge 58*b*, positioned on opposite sides of the lever arm 32. The strain gauges 58*a*, 58*b* are configured to detect a bending strain (e.g., a change in the electrical resistance) on the respective side of the lever arm 32.

In alternative constructions (not shown), fewer or more strain gauges 58*a*, 58*b* may be provided. In some constructions, the gauges may be another type of sensor operable to detect torque, rather than strain gauges.

In some constructions, the PCB 48 supports (see FIG. 5) a controller 104 electrically and/or communicatively connected to a variety of modules or components of the wrench 10. For example, the controller 104 may be connected to the torque detection mechanism 54, a user-interface, a hydraulic pressure source or pump, a power supply, etc. The controller 104 includes a plurality of electrical and electronic components that provide power, operational control, and protection to the components and modules within the controller 104 and/or the wrench 10. For example, the controller 104 includes, among other things, the electronic processor 108 (a programmable electronic microprocessor, microcontroller, or similar device), a memory 112, and an input/output (I/O) interface (e.g., a communication circuit 116). The electronic processor 108 is communicatively coupled to the memory 112 and the I/O interface. A power supply circuit 120 including a power source (e.g., a battery 124) is operable to power electronic components of the control system 48.

The controller 104 may be implemented in several independent controllers each configured to perform specific functions or sub-functions. Additionally, the controller 104 may contain sub-modules that include additional electronic processors, memory, or application specific integrated circuits (ASICs) for handling communication functions, processing of signals, and application of the methods listed below. In other constructions, the controller 104 includes additional, fewer, or different components.

The memory 112 is, for example, a non-transitory, machine-readable memory. The memory 112 includes, for example, one or more non-transitory machine-readable media, a program storage area and a data storage area. The program storage area and the data storage area can include combinations of different types of memory, such as read-only memory (ROM) and random access memory (RAM). In some constructions, data is stored in a non-volatile random-access memory (NVRAM) of the memory. Various non-transitory computer readable media, for example, magnetic, optical, physical, or electronic memory may be used.

In the illustrated construction, the memory 112 includes an input controller engine (not shown; for example, software or a set of computer-readable instructions that determines functions to be executed in response to inputs) and wrench functions (for example, software or a set of computer-readable instructions that provide functionality to the wrench 10).

The electronic processor 108 is communicatively coupled to the memory 112 and executes software instructions that are stored in the memory 112, or stored in another non-transitory computer readable medium such as another memory or a disc. The software may include one or more applications, program data, filters, rules, one or more program modules, and other executable instructions. In some constructions, the memory 112 stores predetermined functions as well as other functions that are executed to provide wrench functionality, within the program storage area.

The I/O interface is communicatively coupled to components external to the controller 104 and coordinates the communication of information between the electronic processor 108, the torque detection mechanism 54, other components of the wrench 10, external devices (not shown; e.g., a user device (such as a tablet, a personal computer, a mobile phone, etc.), a pump control, a valve control, etc.), etc. In illustrated examples, information received from an input component, an external device, etc., is provided to the electronic processor 108 to assist in determining functions to be executed and outputs to be provided. The determined functionality is executed with the electronic processor 108 with the software located the memory 112.

The communication circuit 116 enables communication with one or more external devices. In some embodiments, the communication circuit 116 includes, among other things, a transceiver 128. In some embodiments, the communication circuit 116 is configured to wirelessly communicate with one or more external devices using radio-frequency (RF) based communication. In such embodiments, the communication circuit 116 may be configured to transmit signals to and receive signals from one or more external devices. In some embodiments, the communication circuit 116 is configured to transmit signals to, but not receive signals from one or more external devices. In some embodiments (not shown), the transceiver 128 may be replaced with either a transmitter and/or a receiver.

The transceiver 128 may wirelessly transmit, to one or more external devices, signals that include the information generated by the torque detection mechanism 54. Signals transmitted by the communication circuit 116 may additionally include an identifier that identifies the wrench 10 to which the communication circuit 116 is attached.

In some embodiments, the transceiver 128 allows for short-range radio communication (e.g., Bluetooth®, WiFi, NFC, ZigBee, etc.) with one or more external devices. For example, the transceiver 128 may broadcast signals that include information generated by the torque detection mechanism 54 to nearby devices. In some embodiments, the transceiver 128 may allow for long-range radio communication (e.g., cellular communication over a cellular network) with one or more external devices.

In some embodiments, the transceiver 128 enables wired communication with one or more external devices. In such embodiments, the communication circuit 116 may communicate directly with an external device using one or more signal lines.

To use the wrench 10, a user seats the reaction arm 26 against a reaction surface (e.g., a stationary surface adjacent the workpiece) and activates the fluid actuator 30. Pressurized fluid from the hydraulic pump actuates (e.g., extends) the fluid actuator, thereby pivoting the lever arm 32 and driving the sprocket 42 and socket 22 to rotate in the first direction. The force applied to the lever arm 32 by the working end 34 causes deflection of the lever arm 32. The strain gauges 58*a*, 58*b* detect the bending strain of the lever arm 32 and communicate the strain to the controller 104. The controller 104 converts the bending strain into torque. In other constructions, information representative of the bending strain may be communicated for processing by an external device to calculate the torque.

The communication circuit 116 communicates information representative of the bending strain, the torque, etc., to an external device for storage in external memory, control of the pump and/or the wrench 10. For example, the calculated torque may be used to determine termination of a torque application operation by the wrench 10.

In the illustrated constructions, the strain gauges 58*a*, 58*b* are coupled to the controller 104 via wires (not shown) extending from the strain gauges 58*a*, 58*b* to the controller 104. The wires are flexible wires, which carry a signal to the controller 104, and are positioned along a specific path to avoid wear and/or pinching. In other constructions (not shown), the strain gauges 58*a*, 58*b* may be coupled to the controller 104 in another manner (e.g., wirelessly).

Unlike conventional methods for calculating torque exerted by a hydraulic wrench based on hydraulic pressure, strain gauges 58*a*, 58*b* permit more direct measurement of the torque transmitted to the socket 22 by the lever arm 32. This configuration may provide a more accurate determination of torque applied by the wrench 10 during operation.

The gauge(s) 58*a*, 58*b* may be positioned on the wrench 10 in a different manner. For example, as shown in FIG. 3, the gauge(s) 58*a*, 58*b* are positioned adjacent the reaction arm 26 of the wrench 10. As illustrated, the wrench 10 includes a beam 62, and the gauge(s) 58*a*, 58*b* are coupled between the beam 62 and the housing 14. In the illustrated constructions, the beam 62 includes two strain gauges 58*a*, 58*b*. However, in alternative constructions (not shown), the beam 62 may include fewer or more strain gauges 58*a*, 58*b*. In some constructions, the gauges may be another type of sensor operable to detect force exerted on the beam 62.

During operation of the wrench 10, the beam 62 is seated against the reaction surface. As the fluid actuator 30 is activated and torque is applied to the workpiece, a reaction force is exerted on the reaction arm via the beam 62. The gauges 58*a*, 58*b* each detect a force value (e.g., a load) on the beam 62 and communicate the force value to the controller 104. Specifically, the first gauge 58*a* detects a first force value at a first location on the beam 62, and the second gauge 58*b* detects a second force value at a second location on the beam 62. The distances between a center or midpoint M of the socket 22 and each of the gauges 58*a*, 58*b* is predetermined.

Using the measured first and second force values and the known locations of the gauges 58*a*, 58*b*, the controller 104 determines a total force value exerted onto the beam 62 and a reaction force point P at which the force is exerted. Then, the controller 104 calculates a distance D between the reaction force point P and the midpoint M of the socket 22. The controller 104 calculates the torque applied by the wrench 10 during operation using the total force value and the distance D between the reaction force point P and the midpoint M. Similar to the construction of FIG. 2, the configuration of FIG. 3 may provide a more accurate determination of torque exerted on the workpiece during operation.

Figure 4:
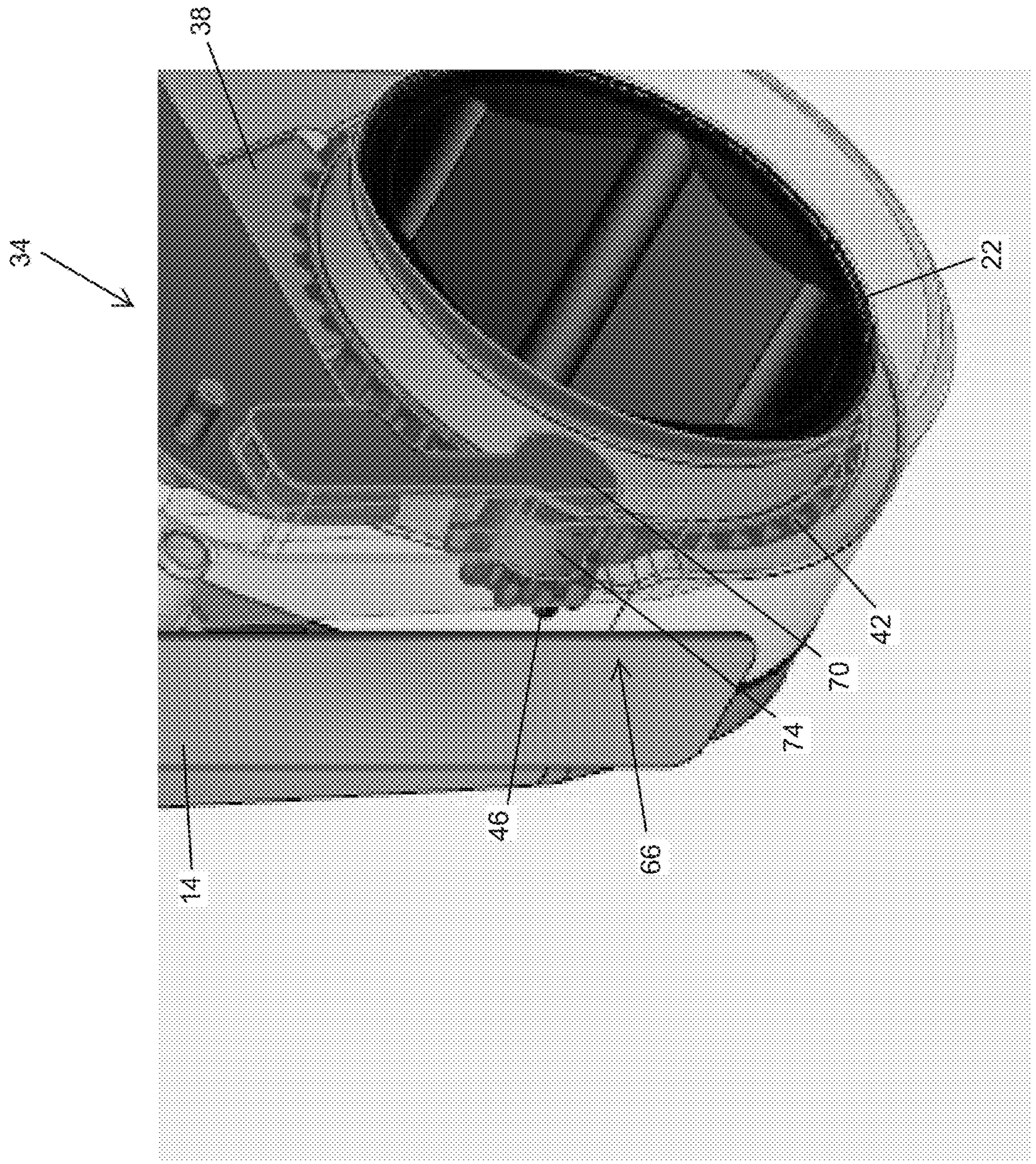
FIG. 4 is an enlarged perspective view of a portion of the wrench of FIG. 1, illustrating a drive element and a turn angle detection mechanism.

As shown in FIG. 4, the wrench 10 includes a turn angle detection mechanism 66 configured to detect an angle of rotation of a fastener. In the illustrated construction, a gear 46 is supported in the housing 14 and is driven to rotate in response to rotation of the sprocket 42. A sensor 70 is in electrical communication with the controller 104 and positioned on the PCB 48, adjacent the gear 46, and a magnet 74 is coupled to the gear 46 for movement therewith. The illustrated sensor 70 is a magnetic flux detection sensor and is operable to detect movement (e.g., a rotational position) of the magnet 74. In other constructions, rotation of the gear 46 and/or of the fastener may be measured in a different manner.

As mentioned above, as the fluid actuator 30 is activated and the pawl 38 engages and rotates the sprocket 42, the sprocket teeth engage the teeth of the gear 46 such that rotation of the sprocket 42 rotates the gear 46. The sensor 70 detects the movement of the magnet 74 and outputs a signal to the controller 104 indicating the position of the magnet 74 and, therefore, of the gear 46. The sensor 70 continuously detects the magnet 74 during operation of the wrench 10, thereby measuring a total angle of rotation of the workpiece driven by the socket 22.

In some constructions, the controller 104 correlates each position measurement measured by the sensor 70 with a corresponding torque value simultaneously measured via the strain gauge(s) 58*a*, 58*b*. The controller 104 uses the measured angle of rotation data and the measured torque data to calculate a load applied to the workpiece by the wrench 10. Information from the turn angle detection mechanism 66 is communicated by the communication circuit 116 with an external device, for example, for storage in an external memory, control of the wrench 10, a pump, etc.

In typical hydraulic wrench applications, the load applied to a fastener is often calculated solely as a function of torque. Such calculations do not account for the variable friction present in bolted joints. The turn angle detection mechanism 66 allows for the measured torque data to be associated with a specific rotational position, thereby providing an accurate calculation of load applied to the fastener.

In some constructions, the controller 104 stores the torque, position, and bolt load data within the memory 112 of the controller 104, which can then be transmitted to an external device (e.g., a central database). In some constructions, the data may be displayed on a user-interface (not shown) in communication with the control system 46. For example, the user-interface may display the data in a graphical format. In such constructions, the torque and position data may be represented as a curve. A gradient of the curve may indicate a stiffness of the joint receiving the fastener, while an area under the curve may indicate the load applied to the fastener, and changes in gradient may indicate failure of the joint.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more features and/or advantages of the invention may be set forth in the following claims:

What is claimed is:

1. A hydraulic torque wrench operable to exert a torque on a workpiece, the wrench comprising:
- a housing;
- a drive element for engaging the workpiece;
- a drive actuator for transmitting a torque to the drive element; and
- a gauge coupled to at least one of the housing and the drive actuator, the gauge being configured to detect a characteristic indicative of a torque exerted by the drive element to the workpiece, wherein the drive actuator includes a lever arm for rotating the drive element, and wherein the gauge includes a strain gauge coupled to the lever arm and configured to measure a bending strain of the lever arm.

2. The wrench of claim 1, further comprising a control system configured to calculate a torque value based on the characteristic.

3. The wrench of claim 1, wherein the strain gauge is a first strain gauge, and wherein the gauge includes a second strain gauge coupled to the lever arm.

4. The wrench of claim 3, wherein the lever arm has a first side and an opposite second side, the first strain gauge being coupled to and configured to detect a bending strain on the first side, and the second strain gauge being coupled to and configured to detect a bending strain on the second side.

5. A hydraulic torque wrench operable to exert a torque on a workpiece, the wrench comprising:
- a housing;
- a drive element for engaging the workpiece;
- a drive actuator for transmitting a torque to the drive element; and
- a gauge coupled to at least one of the housing and the drive actuator, the gauge being configured to detect a characteristic indicative of a torque exerted by the drive element to the workpiece, wherein the gauge is configured to detect a reaction force exerted on a reaction portion of the housing, wherein the gauge includes a strain gauge positioned adjacent a reaction portion of the housing, and wherein the strain gauge is a first strain gauge, and wherein the gauge includes a second strain gauge positioned adjacent a reaction portion of the housing.

6. The wrench of claim 5, wherein the drive element has a center, and wherein the first strain gauge is positioned at a first distance from the center, and the second strain gauge is positioned at a different second distance from the center.

7. A hydraulic torque wrench operable to exert a torque on a workpiece, the wrench comprising:
- a housing;
- a drive element for engaging the workpiece;
- a drive actuator for transmitting a torque to the drive element;
- a gauge coupled to at least one of the housing and the drive actuator, the gauge being configured to detect a characteristic indicative of a torque exerted by the drive element to the workpiece; and
- a sensor configured to detect rotation of the drive element.

8. The wrench of claim 7, wherein the sensor is configured to detect a position of a magnet driven to rotate due to rotation of the drive element.

9. The wrench of claim 8, wherein the sensor is configured to communicate a position of the magnet to a control system.

10. A hydraulic torque wrench operable to exert a torque on a workpiece, the wrench comprising:

a housing;

a drive element for engaging the workpiece;

a drive actuator for transmitting a torque to the drive element; and a sensor supported by the housing and configured to detect rotation of the drive element, wherein the sensor is configured to detect a position of a magnet driven to rotate due to rotation of the drive element.

11. A hydraulic torque wrench operable to exert a torque on a workpiece, the wrench comprising:

a housing;

a drive element for engaging the workpiece;

a drive actuator for transmitting a torque to the drive element;

a sensor supported by the housing and configured to detect rotation of the drive element; and a rotating member driven to rotate by rotation of the drive element, the sensor being configured to detect rotation of the rotating member to thereby detect rotation of the drive element.

12. The wrench of claim 11, wherein the drive element includes a sprocket having sprocket teeth, and wherein the rotating member includes a gear having gear teeth engaging the sprocket teeth.

13. The wrench of claim 12, further comprising a magnet supported on the gear, the sensor being configured to detect a position of the magnet.

14. The wrench of claim 13, wherein the sensor is configured to communicate a position of the magnet to a control system.

15. A method of determining a load exerted on a workpiece by a hydraulic torque wrench, the wrench including a drive actuator for transmitting a torque to a drive element engaging the workpiece, the method comprising:

detecting at least one of a strain of a lever arm transmitting torque to the drive element and a reaction force exerted on a housing of the wrench;

detecting an angle of rotation of the drive element;

determining a torque based on the at least one of the detected strain and the detected reaction force; and determining a load exerted on the workpiece based on the torque and the angle of rotation.

16. The method of claim 15, wherein detecting at least one of a strain of a lever arm includes detecting, with a strain gauge coupled to the lever arm, a strain of a lever arm.

17. The method of claim 16, wherein the strain gauge is a first strain gauge, and wherein detecting at least one of a strain of a lever arm includes detecting, with a first strain gauge and a second strain gauge coupled to the lever arm, a strain of a lever arm.

18. The method of claim 15, wherein detecting a reaction force includes detecting, with a gauge, a reaction force exerted on a reaction portion of the housing.

19. The method of claim 18, wherein detecting a reaction force includes detecting, with a strain gauge, a reaction force exerted on a reaction portion of the housing.

20. The method of claim 19, wherein the strain gauge is a first strain gauge, and wherein detecting a reaction force includes detecting, with a first strain gauge and a second strain gauge, a reaction force exerted on a reaction portion of the housing.

21. The method of claim 15, wherein detecting an angle of rotation includes detecting a position of a magnet driven to rotate due to rotation of the drive element.

22. The method of claim 15, wherein the drive element includes a sprocket having sprocket teeth, wherein a gear has gear teeth engaging the sprocket teeth, and wherein detecting an angle of rotation includes detecting rotation of the gear.

23. The method of claim 15, wherein determining a torque includes calculating, with a control system, a torque transmitted by the drive element to the workpiece.

24. The method of claim 15, wherein determining a load includes calculating, with a control system, a load exerted on the workpiece.

25. A method of determining a load exerted on a workpiece by a hydraulic torque wrench, the wrench including a drive actuator for transmitting a torque to a drive element engaging the workpiece, the method comprising:

detecting at least one of a strain of a lever arm transmitting torque to the drive element and a reaction force exerted on a housing of the torque wrench;

determining a torque based on the at least one of the detected strain and the detected reaction force; and determining a load exerted on the workpiece based on the torque.

26. The method of claim 25, further comprising detecting an angle of rotation of the drive element, and wherein determining a load includes determining a load exerted on the workpiece based on the torque and the angle of rotation.

27. A method of determining a load exerted on a workpiece by a hydraulic torque wrench, the wrench including a drive actuator for transmitting a torque to a drive element engaging the workpiece, the method comprising:

detecting an angle of rotation of the drive element; and determining a load exerted on the workpiece based on the angle of rotation.

28. The method of claim 27, further comprising:

detecting at least one of a strain of a lever arm transmitting torque to the drive element and a reaction force exerted on a housing of the torque wrench; and determining a torque based on the at least one of the detected strain and the detected reaction force; and wherein determining a load includes determining a load exerted on the workpiece based on the torque and the angle of rotation.

* * * * *